United States Patent
Masuko et al.

(10) Patent No.: US 9,780,408 B2
(45) Date of Patent: Oct. 3, 2017

(54) GARNET-TYPE LI-ION CONDUCTIVE OXIDE AND ALL-SOLID LI-ION SECONDARY BATTERY

(71) Applicant: TDK CORPORATION, Tokyo (JP)

(72) Inventors: Taisuke Masuko, Tokyo (JP); Teiichi Tanaka, Tokyo (JP); Takeo Tsukada, Tokyo (JO)

(73) Assignee: TDK CORPORATION, Tokyo (JP)

( * ) Notice: Subject to any disclaimer, the term of this patent is extended or adjusted under 35 U.S.C. 154(b) by 28 days.

(21) Appl. No.: 15/063,620

(22) Filed: Mar. 8, 2016

(65) Prior Publication Data

US 2016/0268628 A1  Sep. 15, 2016

(30) Foreign Application Priority Data

Mar. 10, 2015 (JP) .................................. 2015-047173
Feb. 3, 2016 (JP) .................................. 2016-018898

(51) Int. Cl.
*H01M 10/0562* (2010.01)
*H01M 10/42* (2006.01)
*H01M 10/0585* (2010.01)
*H01M 10/052* (2010.01)

(52) U.S. Cl.
CPC ... *H01M 10/0562* (2013.01); *H01M 10/4235* (2013.01); *H01M 10/052* (2013.01); *H01M 10/0585* (2013.01); *H01M 2300/0071* (2013.01)

(58) Field of Classification Search
CPC ........... H01M 10/0562; H01M 10/052; H01M 10/0585; H01M 2300/0077
See application file for complete search history.

(56) References Cited

U.S. PATENT DOCUMENTS

| | | | |
|---|---|---|---|
| 2010/0047696 A1 | 2/2010 | Yoshida et al. | |
| 2015/0099190 A1* | 4/2015 | Holme | H01M 10/0525 429/322 |
| 2016/0111751 A1* | 4/2016 | Badding | C01G 25/006 429/322 |
| 2016/0190639 A1* | 6/2016 | Sung | H01M 10/0562 429/319 |
| 2016/0268629 A1* | 9/2016 | Tanaka | H01M 10/0562 |

FOREIGN PATENT DOCUMENTS

JP 2011-051800 A 3/2011

OTHER PUBLICATIONS

Murugan, Ramaswamy et al. "Fast Lithium Ion Conduction in Garnet-Type Li7La3Zr2O12". Angewandte Chemie International Edition, vol. 46, Sep. 5, 2007, pp. 7778-7781.

* cited by examiner

*Primary Examiner* — Stewart Fraser
(74) *Attorney, Agent, or Firm* — Oliff PLC

(57) ABSTRACT

A garnet-type Li-ion conductive oxide containing $Li_xLa_3Zr_2O_{12}$ ($6 \leq x \leq 8$) contains Al and element T (T is one or more from Ni, Cu, Co, and Fe). The content of Al is, in terms of $Al_2O_3$, 2.5 mol % $\leq Al_2O_3 \leq$ 15 mol % with respect to a total amount of $Li_xLa_3Zr_2O_{12}$ contained in the garnet-type Li-ion conductive oxide. The content of element T is 25 mol % $\leq T \leq$ 100 mol % with respect to the total amount of $Li_xLa_3Zr_2O_{12}$ contained in the garnet-type Li-ion conductive oxide.

4 Claims, 3 Drawing Sheets

GARNET-TYPE LI-ION CONDUCTIVE OXIDE AND ALL-SOLID LI-ION SECONDARY BATTERY

CROSS-REFERENCE TO RELATED APPLICATION

This application claims priority from Japanese Patent Application No. 2015-047173 filed with the Japan Patent Office on Mar. 10, 2015, the entire content of which is hereby incorporated by reference.

The present disclosure relates to garnet-type Li-ion conductive oxides and all-solid Li-ion secondary batteries.

BACKGROUND

In an all-solid Li-ion secondary battery, solid electrolyte is used. Therefore, the all-solid Li-ion secondary battery has high thermal stability compared with a Li-ion secondary battery in which nonaqueous electrolyte is used. Among others, an oxide solid electrolyte has the feature of also being chemically stable. Main characteristics required from a solid electrolyte include, e.g., high lithium ion conductivity, good chemical stability, and a wide potential window. Among those characteristics, $Li_7La_3Zr_2O_{12}$ (hereafter simply referred to as "LLZ") satisfies the chemical stability and wide potential window requirements. For this reason, LLZ is considered one of the most promising solid electrolyte candidates (see, for example, Japanese Patent No. 5132639 and Angew. Chem. Int. Ed., 2007, 46, 7778-7781).

SUMMARY

A garnet-type Li-ion conductive oxide contains $Li_xLa_3Zr_2O_{12}$ (6≤x≤8) and contains Al and element T (T is one or more from Ni, Cu, Co, and Fe). The content of Al is, in terms of $Al_2O_3$, 2.5 mol %≤$Al_2O_3$≤15 mol % with respect to a total amount of $Li_xLa_3Zr_2O_{12}$ contained in the garnet-type Li-ion conductive oxide. The content of element T is 25 mol %≤T≤100 mol % with respect to the total amount of $Li_xLa_3Zr_2O_{12}$ contained in the garnet-type Li-ion conductive oxide.

DETAILED DESCRIPTION OF THE EMBODIMENTS

Figure 1:
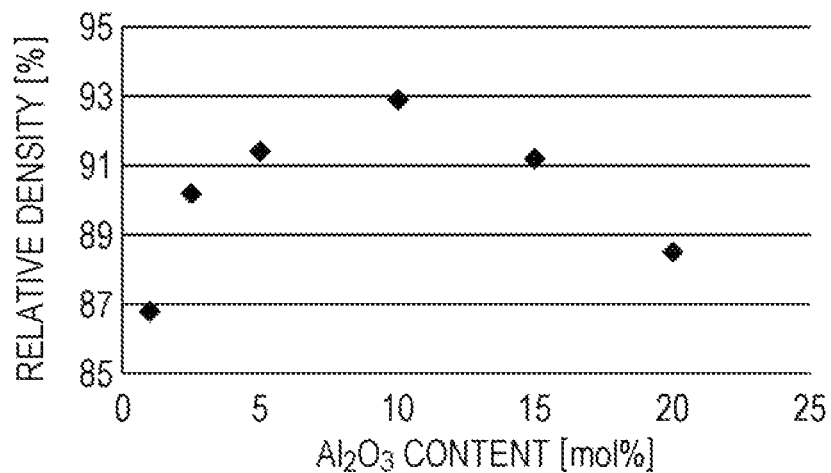
FIG. 1 is a diagram of the relative density of garnet-type Li-ion conductive oxides obtained in Comparative Example 1, Comparative Example 2, and Example 1 to Example 4.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In order to use a garnet-type Li-ion conductive oxide as solid electrolyte, a further increase in sintering density is desirable from the viewpoint of mechanical strength.

In a method for manufacturing ceramics sintered material according to Japanese Patent No. 5132639, an increase in ion conductivity is achieved by having Al contained in a garnet-type Li-ion conductive oxide including LLZ as a principal component. However, high sintering density is not achieved.

An object of the present disclosure is to provide an Al-containing garnet-type Li-ion conductive oxide having LLZ as a principal component, the oxide having high sintering density and good ion conductivity. Another object of the present disclosure is to provide an all-solid Li-ion secondary battery employing the garnet-type Li-ion conductive oxide as solid electrolyte.

In trying to achieve the objects, the present inventors have discovered that by having an appropriate amount of one or more oxides selected from the group consisting of NiO, CuO, $CoO_{4/3}$, and $FeO_{3/2}$ contained in an Al-containing garnet-type Li-ion conductive oxide having LLZ as a principal component, a garnet-type Li-ion conductive oxide having high sintering density can be obtained.

That is, according to an aspect of the present disclosure, a garnet-type Li-ion conductive oxide containing $Li_xLa_3Zr_2O_{12}$ (6≤x≤8) contains Al and element T (T is one or more from Ni, Cu, Co, and Fe). The content of Al is, in terms of $Al_2O_3$, 2.5 mol %≤$Al_2O_3$≤15 mol % with respect to a total amount of $Li_xLa_3Zr_2O_{12}$ contained in the garnet-type Li-ion conductive oxide. The content of element T is 25 mol %≤T≤100 mol % with respect to the total amount of $Li_xLa_3Zr_2O_{12}$ contained in the garnet-type Li-ion conductive oxide.

According to the other aspects of the present disclosure, a garnet-type Li-ion conductive oxide containing $Li_xLa_3Zr_2O_{12}$ (6≤x≤8) contains $Al_2O_3$ and M (M is one or more oxides selected from NiO, CuO, $CoO_{4/3}$, and $FeO_{3/2}$). The contents of $Al_2O_3$ and M with respect to a total amount of $Li_xLa_3Zr_2O_{12}$ contained in the garnet-type Li-ion conductive oxide are such that 2.5 mol %≤$Al_2O_3$≤15 mol %, and 25 mol %≤M≤100 mol %.

The garnet-type Li-ion conductive oxide according to the above aspect has higher sintering density than a typical Al-containing garnet-type Li-ion conductive oxide having LLZ as a principal component. The present inventors believe that the increase in sintering density is due mainly to the addition of one or more oxides selected from NiO, CuO, $CoO_{4/3}$, and $FeO_{3/2}$ to the Al-containing garnet-type Li-ion conductive oxide having LLZ as a principal component.

The garnet-type Li-ion conductive oxide may be used as solid electrolyte in an all-solid Li-ion secondary battery. In this way, an all-solid Li-ion secondary battery having high discharge capacity can be provided.

According to an aspect of the present disclosure, an Al-containing garnet-type Li-ion conductive oxide including LLZ and having high sintering density and good ion conductivity can be provided. Further, by using the garnet-type Li-ion conductive oxide as solid electrolyte, an all-solid Li-ion secondary battery with excellent battery characteristics can be provided.

In the following, a preferred embodiment of the present disclosure will be described with reference to the drawings. The technology according to the present disclosure is not limited to the following embodiment. The constituent elements described below may include other constituent elements that may readily occur to those skilled in the relevant art, or constituent elements substantially identical to the described constituent elements. Further, the constituent elements described below may be used in combination as needed.

A garnet-type Li-ion conductive oxide according to the present embodiment contains $Li_xLa_3Zr_2O_{12}$ ($6 \leq x \leq 8$) and contains Al and element T (T is one or more from Ni, Cu, Co, and Fe). The content of Al is, in terms of $Al_2O_3$, 2.5 mol % $\leq Al_2O_3 \leq$ 15 mol % with respect to a total amount of $Li_xLa_3Zr_2O_{12}$ contained in the garnet-type Li-ion conductive oxide. The content of element T is 25 mol % $\leq T \leq$ 100 mol % with respect to the total amount of $Li_xLa_3Zr_2O_{12}$ contained in the garnet-type Li-ion conductive oxide.

The garnet-type Li-ion conductive oxide according to the present embodiment has higher sintering density than a typical Al-containing garnet-type Li-ion conductive oxide including LLZ. This is believed to be the result of the function of element T. Element T may have any valence state and may be an oxide or another compound.

The garnet-type Li-ion conductive oxide having $Li_xLa_3Zr_2O_{12}$ ($6 \leq x \leq 8$) is identified by, e.g., powder X-ray diffraction. It goes without saying that it is only required that the oxide be identified as being $Li_xLa_3Zr_2O_{12}$ or the so-called LLZ, and that the LLZ is not necessarily required to have the stoichiometric composition. In other words, the LLZ may have deficiency, such as oxygen deficiency.

The element T that is added to the garnet-type Li-ion conductive oxide is quantitated by, e.g., high-frequency inductively coupled plasma (ICP) optical emission spectroscopy with respect to a powder of the garnet-type Li-ion conductive oxide.

A garnet-type Li-ion conductive oxide containing $Li_xLa_3Zr_2O_{12}$ ($6 \leq x \leq 8$) according to the present embodiment contains $Al_2O_3$ and M (M is one or more oxides selected from NiO, CuO, $CoO_{4/3}$, and $FeO_{3/2}$). The contents of $Al_2O_3$ and M with respect to a total amount of $Li_xLa_3Zr_2O_{12}$ contained in the garnet-type Li-ion conductive oxide are such that
2.5 mol % $\leq Al_2O_3 \leq$ 15 mol %, and
25 mol % $\leq M \leq$ 100 mol %.

The content of $Al_2O_3$ with respect to the total amount of $Li_xLa_3Zr_2O_{12}$ included in the garnet-type Li-ion conductive oxide may be in a range (relationship) of 2.5 mol % $\leq Al_2O_3 \leq$ 15 mol %. In this way, good lithium ion conductivity can be obtained. If the content of $Al_2O_3$ is less than 2.5 mol %, a tetragonal phase of LLZ with low lithium ion conductivity tends to be produced. If the content of $Al_2O_3$ exceeds 15 mol %, $LaAlO_3$ with low lithium ion conductivity tends to be produced. Thus, if the content of $Al_2O_3$ is outside the above range, lithium ion conductivity is decreased.

M is one or more oxides selected from NiO, CuO, $CoO_{4/3}$, and $FeO_{3/2}$.

The content of M with respect to the total amount of $Li_xLa_3Zr_2O_{12}$ included in the garnet-type Li-ion conductive oxide is in a range of 25 mol % $\leq M \leq$ 100 mol %. In this way, high sintering density (relative density of 90% or more) can be obtained. If the content of M is less than 25 mol %, sufficient density improvement effect cannot be obtained. If the content of M is more than 100 mol %, ion conductivity is decreased.

LLZ may be identified and Al and M may be quantitated by the same methods as the methods for identifying element T described above.

As described above, M may be present in oxide state. M may be present on a particle surface of or between the LLZ particles. When a fine-particle compound such as M is present in the grain boundaries, the voids between the LLZ particles are filled, whereby sintering density is increased. In this case, M may be present in amorphous state. Whether M is in amorphous state or not may be distinguished by, e.g., X-ray diffraction based on the presence or absence of a peak related to M.

According to the present embodiment, an all-solid Li-ion secondary battery including solid electrolyte with high sintering density can be obtained because of the use of the above-described garnet-type Li-ion conductive oxide.

A method for manufacturing the garnet-type Li-ion conductive oxide according to the present embodiment will be described. The method for manufacturing the garnet-type Li-ion conductive oxide according to the present embodiment includes mixing a Li compound, a La compound, a Zr compound, $Al_2O_3$, and M (M is one or more oxides selected from NiO, CuO, $CoO_{4/3}$, and $FeO_{3/2}$), and firing the mixed raw materials.

Examples of the Li compound include LiOH or a hydrate thereof, $Li_2CO_3$, $LiNO_3$, and $CH_3COOLi$. Examples of the La compound include $La_2O_3$, $La(OH)_3$, $La_2(CO)_3$, $La(NO_3)_3$, and $(CH_3COO)_3La$. Examples of the Zr compound include $ZrO_2$, $ZrO(NO_3)_2$, $ZrO(CH_3COO)_2$, and $Zr(OH)_2CO_3$.

Manufacturing Method

An example of the method for manufacturing the garnet-type Li-ion conductive oxide according to the present embodiment will be described. The oxide manufacturing method includes (1) step of adding $Al_2O_3$ to raw material such as the lithium compound and then mixing and pulverizing the material; (2) calcining step of producing a calcined powder at a predetermined calcination temperature; (3) step of adding to the calcined powder element T or M (M is one or more oxides selected from NiO, CuO, $CoO_{4/3}$, and $FeO_{3/2}$) and then mixing and pulverizing the powder; (4) step of molding the powder; and (5) step of firing. In the following, the steps will be described in order.

(1) Step of Adding $Al_2O_3$ to Raw Material Such as the Lithium Compound and then Mixing and Pulverizing In the step of adding $Al_2O_3$ to raw material such as the lithium compound and then mixing, starting materials including the elements of the chemical formula $Li_xLa_3Zr_2O_{12}$ (where X is $6 \leq X \leq 8$) are weighed and mixed to achieve the stoichiometric proportion of the chemical formula. At this time, the added amount of $Al_2O_3$ is set to be within a range of, in terms of mole percentage, 2.5 mol % or more and 15 mol % or less with respect to the compound expressed by the chemical formula $Li_xLa_3Zr_2O_{12}$ (where X is $6 \leq X \leq 8$). In this way, a garnet-type Li-ion conductive oxide having high ion conductivity can be obtained.

Regarding the method for mixing the raw materials, the raw materials may be mixed and pulverized by dry method without being put into solvent. Alternatively, the raw materials may be put into solvent and mixed and pulverized by wet method. By the wet method of mixing and pulverizing including putting the raw materials into solvent, mixing property can be enhanced. The raw material mixing method may include the use of a planetary mill, an attritor, a ball mill or the like. For example, a solvent that does not readily dissolve Li may be used. As the solvent, organic solvent such as ethanol may be used. The mixing time may be 1 to 32 hours, depending on the mixed amount.

(2) Calcining Step of Obtaining Calcined Powder at Predetermined Calcination Temperature In the calcining step, the mixed powder obtained in the raw material mixing step is calcined. The calcination temperature may be not lower than a temperature at which a state change in starting material (such as the generation of gas or a phase change) occurs and lower than the firing temperature. For example, when $LiCO_3$ is used as starting material, the calcination temperature may be not lower than the temperature at which the carbonate is decomposed and lower than the firing temperature. In this way, during the subsequent firing, a density decrease due to the generation of gas by thermal decomposition can be suppressed. Specifically, the calcination temperature may be 800° C. to 1000° C.

(3) Step of Adding Element T or M (M is One or More Oxides Selected from NiO, CuO, $CoO_{4/3}$, and $FeO_{3/2}$) to the Calcined Powder Followed by Mixing and Pulverizing In the step of adding element T or M (M is one or more oxides selected from NiO, CuO, $CoO_{4/3}$, and $FeO_{3/2}$) to the calcined powder followed by mixing and pulverizing, a predetermined amount of one or more desired oxides selected from NiO, CuO, $CoO_{4/3}$, and $FeO_{3/2}$ is added to the powder obtained in the calcining step of obtaining the calcined powder at the predetermined calcination temperature, and then the powder is mixed and pulverized. The mixing and pulverizing method may employ a planetary mill, an attritor, a ball mill or the like. As the solvent, a solvent that does not readily dissolve Li may be used. For example, an organic solvent such as ethanol may be used. The mixing and pulverizing time may be 1 to 32 hours, depending on the mixed amount.

(4) Powder Molding Step

In the powder molding step, the powder obtained in the step of adding the second sub-component (element T or M) to the calcined powder followed by mixing and pulverizing is molded. The molding may be formed into an arbitrary shape by, e.g., cold isostatic pressing (CIP), hot isostatic pressing (HIP), metal molding, or hot pressing. The molding method may include a molding method by sheeting using a doctor blade or a roll coater.

(5) Firing Step

In the firing step, the molding obtained in the powder molding step is fired. As a result, the garnet-type Li-ion conductive oxide according to the present embodiment is obtained.

The firing atmosphere may be the atmospheric air or a reducing atmosphere. In the atmospheric air, while the density of the sintered material is increased, ion conductivity may possibly be decreased. The reason is that in the atmospheric air, Ni and LLZ may react with each other, producing a large amount of a heterogenous phase with low ion conductivity. The firing temperature may be not lower than the crystallizing temperature of the garnet-type Li-ion conductive oxide to be obtained. The firing temperature may be in a range of, e.g., 1050° C. to 1150° C. If the firing temperature is lower than 1050° C., it may become difficult to obtain the high-density sintered material. If the firing temperature is higher than 1150° C., Li evaporation and the development of a heterogenous phase ($La_2Zr_2O_7$) may be caused, resulting in a decrease in ion conductivity. The firing time may be in a range of 2 to 20 hours.

All-Solid Lithium Secondary Battery

Figure 5:
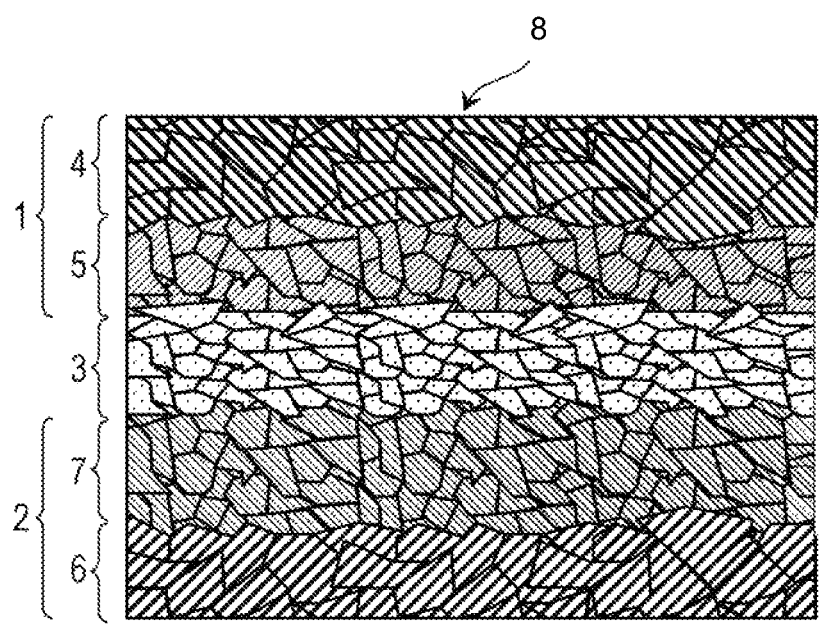
FIG. 5 is a cross sectional diagram of a conceptual structure of the Li-ion secondary battery.

As illustrated in FIG. 5, an all-solid lithium secondary battery 10 according to the present embodiment includes a positive electrode layer 1, a negative electrode layer 2, and a solid electrolyte layer 3. The solid electrolyte layer 3 is a garnet-type Li-ion conductive oxide including $Li_xLa_3Zr_2O_{12}$ (6≤x≤8) as a principal component. The garnet-type Li-ion conductive oxide contains $Al_2O_3$ and M (M is one or more oxides selected from NiO, CuO, $CoO_{4/3}$, and $FeO_{3/2}$). The contents of $Al_2O_3$ and M with respect to the total amount of $Li_xLa_3Zr_2O_{12}$ included in the garnet-type Li-ion conductive oxide are in the following ranges.

2.5 mol %≤$Al_2O_3$≤15 mol %
25 mol %≤M≤100 mol %

The all-solid lithium secondary battery 10 of this configuration provides a practical secondary battery compared with typical products.

The positive electrode layer 1 of the all-solid Li-ion secondary battery 10 according to the present embodiment includes a positive electrode active material layer 5 and a positive electrode current collector layer 4. The negative electrode layer 2 includes a negative electrode active material layer 7 and a negative electrode current collector layer 6.

The materials of the positive electrode active material layer 5 and the negative electrode active material layer 7 may include known positive electrode active material and negative electrode active material used in conventional lithium secondary batteries, and may be manufactured by a method well known in the relevant art.

Positive Electrode Active Material

The material for the positive electrode active material layer 5 is not particularly limited, and positive electrode active materials typically used in known all-solid batteries may be used. Specific examples of the positive electrode active material include manganese dioxide ($MnO_2$), iron oxide, copper oxide, nickel oxide, lithium-manganese composite oxide (such as $Li_xMn_2O_4$ and $Li_xMnO_2$), lithium-nickel composite oxide (such as $Li_xNiO_2$), lithium-cobalt composite oxide (such as $Li_xCoO_2$), lithium-nickel-cobalt composite oxide (such as $LiNi_{1-y}Co_yO_2$), lithium-manganese-cobalt composite oxide (such as $LiMn_yCo_{1-y}O_2$), spinel-type lithium-manganese-nickel composite oxide (such as $Li_xMn_{2-y}Ni_yO_4$), lithium phosphate compound having olivine structure (such as $Li_xFePO_4$, $Li_xFe_{1-y}Mn_yPO_4$, $Li_xCoPO_4$, and $LiVOPO_4$), lithium phosphate compound having the NASICON structure (such as $Li_xV_2(PO_4)_3$, $Li_2VOP_2O_7$, $Li_2VP_2O_7$, $Li_4(VO)(PO_4)_2$, and $Li_9V_3(P_2O_7)_3(PO_4)_2$), iron sulfate ($Fe_2(SO_4)_3$), and vanadium oxide (such as $V_2O_5$). Each of the examples may be used individually or two or more of the examples may be used in combination. In the above chemical formulas, x and y may be in the ranges of 1<x<5 and 0<y<1. Preferably, the positive electrode active material may be $LiCoO_2$, $Li_xNiO_2$, $Li_xV_2(PO_4)_3$, or $LiFePO_4$ among others.

Negative Electrode Active Material

The material of the negative electrode active material layer 7 is not particularly limited, and negative electrode active materials typically used in known all-solid batteries may be used. Specific examples of the negative electrode active material include carbon, metal lithium (Li), metal compound, metal oxide, Li metal compound, Li metal oxide (including lithium-transition metal composite oxide), boron-added carbon, graphite, and compound having the NASICON structure. Each of the above examples may be used individually, or two or more of the examples may be used in combination. For example, when metal lithium (Li) is used as the negative electrode active material, the capacity of the all-solid battery can be increased. The carbon may include typically known carbon material, such as graphite carbon, hard carbon, and soft carbon. Examples of the metal compound include LiAl, LiZn, Li$_3$Bi, Li$_3$Sd, Li$_4$Si, Li$_{4.4}$Sn, and Li$_{0.17}$C(LiC$_6$). Examples of the metal oxide include SnO, SnO$_2$, GeO, GeO$_2$, In$_2$O, In$_2$O$_3$, Ag$_2$O, AgO, Ag$_2$O$_3$, SbO$_3$, Sb$_2$O$_4$, Sb$_2$O$_5$, SiO, ZnO, CoO, NiO, TiO$_2$, and FeO. Examples of the Li metal compound include Li$_3$FeN$_2$, Li$_{2.6}$Co$_{0.4}$N, and Li$_{2.6}$Cu$_{0.4}$N. An example of the Li metal oxide (lithium-transition metal composite oxide) is a lithium-titanium composite oxide represented by Li$_4$Ti$_5$O$_{12}$. Examples of the boron-added carbon include boron-added carbon and boron-added graphite.

Current Collector

The material of the current collector (the positive electrode current collector layer 4 or the negative electrode current collector layer 6) of the all-solid type lithium-ion secondary battery 10 according to the present embodiment may be a material having large conductivity. Examples of the material are silver, palladium, gold, platinum, aluminum, copper, and nickel. Particularly, copper is preferable because it does not readily react with lithium aluminum titanium phosphate and, further, copper is effective in decreasing the internal resistance of the lithium-ion secondary battery. The materials of the positive electrode and the negative electrode included in the current collector may be the same or different from each other.

The positive electrode current collector layer 4 and the negative electrode current collector layer 6 of the lithium-ion secondary battery 10 according to the present embodiment may include a positive electrode active material and a negative electrode active material, respectively.

When the positive electrode current collector layer 4 and the negative electrode current collector layer 6 include a positive electrode active material and a negative electrode active material, respectively, adhesion is increased between the positive electrode current collector layer 4 and the positive electrode active material layer 5, and between the negative electrode current collector layer 6 and the negative electrode active material layer 7.

Method for Manufacturing Lithium Ion Secondary Battery

For manufacturing the lithium ion secondary battery 10 according to this embodiment, first, each material of the positive electrode current collector layer 4, the positive electrode active material layer 5, the solid electrolyte layer 3, the negative electrode active material layer 7, and the negative electrode current collector layer 6, which has been made into a paste, is prepared. Next, these materials are coated and dried, whereby green sheets are manufactured. The obtained green sheets are stacked to manufacture a stacked body, and by firing the stacked body at the same time, the lithium ion secondary battery 10 is manufactured.

A method of making the material into a paste is not limited in particular. For example, the paste can be obtained by mixing the powder of each material in vehicle. Here, the vehicle is a collective term for the medium in a liquid phase. The vehicle includes the solvent and the binder. By this method, the pastes for the positive electrode current collector layer 4, the positive electrode active material layer 5, the solid electrolyte layer 3, the negative electrode active material layer 7, and the negative electrode current collector layer 6 are prepared.

The prepared paste is coated on a base material such as PET in the desired order. Next, the paste on the base material is dried as necessary and then the base material is removed; thus, the green sheet is manufactured. The method of coating the paste is not particularly limited. Any of known methods including the screen printing, the coating, the transcription, and the doctor blade can be used.

A desired number of green sheets can be stacked in the desired order. If necessary, alignment, cutting and the like can be performed to manufacture a stacking block. In the case of manufacturing a parallel type or serial-parallel type battery, the alignment may be conducted when the green sheets are stacked, so that the end face of the positive electrode layer 1 does not coincide with the end face of the negative electrode layer 2.

In order to manufacture the stacked body, the active material unit to be described below may be prepared and the stacking block may be manufactured.

First, the paste for the solid electrolyte layer 3 is formed into a sheet shape on a PET film by the doctor blade method. After the paste for the positive electrode active material layer 5 is printed on the obtained sheet for the solid electrolyte layer 3 by the screen printing, the printed paste is dried. Next, the paste for the positive electrode current collector layer 4 is printed thereon by the screen printing, and then the printed paste is dried. Furthermore, the paste for the positive electrode active material layer 5 is printed again thereon by the screen printing, and the printed paste is dried. Next, by removing the PET film, the positive electrode active material layer unit is obtained. In this manner, the positive electrode active material layer unit in which the paste for the positive electrode active material layer 5, the paste for the positive electrode current collector layer 4, and the paste for the positive electrode active material layer 5 are formed in this order on the sheet for the solid electrolyte layer 3 is obtained. In the similar procedure, the negative electrode active material layer unit is also manufactured. The negative electrode active material layer unit in which the paste for the negative electrode active material layer 7, the paste for the negative electrode current collector layer 6, and the paste for the negative electrode active material layer 7 are formed in this order on the sheet for the solid electrolyte layer 3 is obtained.

One sheet of the positive electrode active material layer unit and one sheet of the negative electrode active material layer unit are stacked via the sheet for the solid electrolyte layer 3. At this time, the units may be staggered such that the paste for the positive electrode current collector layer 4 of the first sheet of the positive electrode active material layer unit extends only over one end face, with the paste for the negative electrode current collector layer 6 of the second sheet of the negative electrode active material layer unit extending only over the other end face. On both sides of the units thus stacked, sheets for the solid electrolyte layer 3 of a predetermined thickness are further stacked, fabricating a stacked block.

The manufactured stacking block is crimped at the same time. The crimping is performed while heat is applied. The heating temperature is, for example, 40° C. to 95° C.

The crimped stacking block is fired by being heated at 600° C. to 1200° C. under the reducing atmosphere. The firing time is, for example, 0.1 to 3 hours. Through this firing, the stacked body is completed.

EXAMPLES

The contents of the present embodiment will be described in more specific terms with reference to examples and a comparative example. It should be noted, however, that the present disclosure is not limited to the following examples.

Examples 1 to 4 and Comparative Examples 1 and 2

As the starting materials, the Li compound (Li$_2$CO$_3$), the La compound (La$_2$O$_3$), the Zr compound (ZrO$_2$), Al$_2$O$_3$, and NiO were used. Initially, $Li_2CO_3$, $La_2O_3$, and $ZrO_2$ were weighed to achieve a molar ratio of Li:La:Zr=7:3:2. Further, $Al_2O_3$ was in each case weighed, as shown in Table 1, with respect to the total amount of the $Li_xLa_3Zr_2O_2$ to be obtained. Thereafter, the weighed starting materials were mixed and pulverized in ethanol, using a ball mill (rotational speed 120 rpm/zirconia balls) for 16 hours. The resultant slurry was separated from the balls and ethanol and then calcined in an alumina crucible at 900° C. for 5 hours in the atmospheric air. NiO was weighed to be 50 mol % with respect to $Li_7La_3Zr_2O_{12}$, which is the principal component of the obtained calcined powder. The calcined powder and the NiO powder were mixed and pulverized in ethanol using a ball mill (120 rpm/zirconia balls) for 16 hours. The resultant slurry was separated from the balls and ethanol and then dried. In this way, a pulverized powder was obtained. Then, an organic system binder was added to the pulverized powder, preparing a granule. The granule was molded into a disc shape using a metal mold of diameter 10 mm at 7 kN. The molding was then fired on a platinum plate at the sintering temperature of 1100° C. for 2 hours in a reducing atmosphere (5% $H_2$/95% $N_2$). In this way, a disc-shaped sintered material sample was obtained.

TABLE 1

| | $Al_2O_3$ (mol %) | NiO (mol %) | Relative density (%) | Ion conductivity (S/cm) |
|---|---|---|---|---|
| Comparative Example 1 | 1.0 | 50 | 86.8 | 3.9E−05 |
| Example 1 | 2.5 | 50 | 90.2 | 5.8E−05 |
| Example 2 | 5.0 | 50 | 91.4 | 6.8E−05 |
| Example 3 | 10.0 | 50 | 92.9 | 8.3E−05 |
| Example 4 | 15.0 | 50 | 91.2 | 6.6E−05 |
| Comparative Example 2 | 20.0 | 50 | 88.5 | 4.8E−05 |

Examples 5 to 7 and Comparative Examples 3 and 4

As the starting materials, the Li compound ($Li_2CO_3$), the La compound ($La_2O_3$), the Zr compound ($ZrO_2$), $Al_2O_3$, and NiO were used. Initially, $Li_2CO_3$, $La_2O_3$, and $ZrO_2$ were weighed to achieve a molar ratio of Li:La:Zr=7:3:2. Further, $Al_2O_3$ was weighed to be 10 mol % with respect to the total amount of the $Li_xLa_3Zr_2O_{12}$ to be obtained. Thereafter, the weighed starting materials were mixed and pulverized in ethanol, using a ball mill (rotational speed 120 rpm/zirconia balls) for 16 hours. The resultant slurry was separated from the balls and ethanol and then calcined in an alumina crucible at 900° C. for 5 hours in the atmospheric air. NiO was weighed, as shown in Table 2, with respect to $Li_7La_3Zr_2O_{12}$, which is the principal component of the obtained calcined powder, to be obtained. The calcined powder and the NiO powder were mixed and pulverized in ethanol using a ball mill (120 rpm/zirconia balls) for 16 hours. The resultant slurry was separated from the balls and ethanol and then dried. In this way, a pulverized powder was obtained. Then, an organic system binder was added to the pulverized powder, preparing a granule. The granule was molded into a disc shape using a metal mold of diameter 10 mm at 7 kN. The molding was then fired on a platinum plate at the sintering temperature of 1100° C. for 2 hours in a reducing atmosphere (5% $H_2$/95% $N_2$). In this way, a disc-shaped sintered material sample was obtained.

TABLE 2

| | $Al_2O_3$ (mol %) | NiO (mol %) | Relative density (%) | Ion conductivity (S/cm) |
|---|---|---|---|---|
| Comparative Example 3 | 10 | 10 | 86.2 | 3.8E−05 |
| Example 5 | 10 | 25 | 91.1 | 6.8E−05 |
| Example 3 | 10 | 50 | 92.9 | 8.3E−05 |
| Example 6 | 10 | 75 | 92.1 | 7.5E−05 |
| Example 7 | 10 | 100 | 91.5 | 6.5E−05 |
| Comparative Example 4 | 10 | 125 | 87.4 | 4.2E−05 |

Example 8

As the starting materials, the Li compound ($Li_2CO_3$), the La compound ($La_2O_3$), the Zr compound ($ZrO_2$), $Al_2O_3$, and $CoO_{4/1}$ were used. Initially, $Li_2CO_3$, $La_2O_3$, and $ZrO_2$ were weighed to achieve a molar ratio of Li:La:Zr=7:3:2. Further, $Al_2O_3$ was weighed to be 10 mol % with respect to the total amount of the $Li_xLa_3Zr_2O_{12}$ to be obtained. Thereafter, the weighed starting materials were mixed and pulverized in ethanol, using a ball mill (rotational speed 120 rpm/zirconia balls) for 16 hours. The resultant slurry was separated from the balls and ethanol and then calcined in an alumina crucible at 900° C. for 5 hours in the atmospheric air. $CoO_{4/3}$ was weighed to be 50 mol % with respect to $Li_7La_3Zr_2O_{12}$, which is the principal component of the obtained calcined powder. The calcined powder and the $CoO_{4/3}$ powder were mixed and pulverized in ethanol using a ball mill (120 rpm/zirconia balls) for 16 hours. The resultant slurry was separated from the balls and ethanol and then dried. In this way, a pulverized powder was obtained. Then, an organic system binder was added to the pulverized powder, preparing a granule. The granule was molded into a disc shape using a metal mold of diameter 10 mm at 7 kN. The molding was then fired on a platinum plate at the sintering temperature of 1100° C. for 2 hours in a reducing atmosphere (5% $H_2$/95% $N_2$). In this way, a disc-shaped sintered material sample was obtained.

Example 9

As the starting materials, the Li compound ($Li_2CO_3$), the La compound ($La_2O_3$), the Zr compound ($ZrO_2$), $Al_2O_3$, and CuO were used. Initially, $Li_2CO_3$, $La_2O_3$, and $ZrO_2$ were weighed to achieve a molar ratio of Li:La:Zr=7:3:2. Further, $Al_2O_3$ was weighed to be 10 mol % with respect to the total amount of the $Li_xLa_3Zr_2O_{12}$ to be obtained. Thereafter, the weighed starting materials were mixed and pulverized in ethanol, using a ball mill (rotational speed 120 rpm/zirconia balls) for 16 hours. The resultant slurry was separated from the balls and ethanol and then calcined in an alumina crucible at 900° C. for 5 hours in the atmospheric air. CuO was weighed to be 50 mol % with respect to $Li_7La_3Zr_2O_{12}$, which is the principal component of the obtained calcined powder. The calcined powder and the CuO powder were mixed and pulverized in ethanol using a ball mill (120 rpm/zirconia balls) for 16 hours. The resultant slurry was separated from the balls and ethanol and then dried. In this way, a pulverized powder was obtained. Then, an organic system binder was added to the pulverized powder, preparing a granule. The granule was molded into a disc shape using a metal mold of diameter 10 mm at 7 kN. The molding was then fired on a platinum plate at the sintering temperature of 1100° C. for 2 hours in a reducing atmosphere (5% $H_2$/95% $N_2$). In this way, a disc-shaped sintered material sample was obtained.

Example 10

As the starting materials, the Li compound ($Li_2CO_3$), the La compound ($La_2O_3$), the Zr compound ($ZrO_2$), $Al_2O_3$, and $FeO_{3/2}$ were used. Initially, $Li_2CO_3$, $La_2O_3$, and $ZrO_2$ were weighed to achieve a molar ratio of Li:La:Zr=7:3:2. Further, $Al_2O_3$ was weighed to be 10 mol % with respect to the total amount of the $Li_xLa_3Zr_2O_{12}$ to be obtained. Thereafter, the weighed starting materials were mixed and pulverized in ethanol, using a ball mill (rotational speed 120 rpm/zirconia balls) for 16 hours. The resultant slurry was separated from the balls and ethanol and then calcined in an alumina crucible at 900° C. for 5 hours in the atmospheric air. $FeO_{3/2}$ was weighed to be 50 mol % with respect to $Li_7La_3Zr_2O_{12}$, which is the principal component of the obtained calcined powder. The calcined powder and the $FeO_{3/2}$ powder were mixed and pulverized in ethanol using a ball mill (120 rpm/zirconia balls) for 16 hours. The resultant slurry was separated from the balls and ethanol and then dried. In this way, a pulverized powder was obtained. Then, an organic system binder was added to the pulverized powder, preparing a granule. The granule was molded into a disc shape using a metal mold of diameter 10 mm at 7 kN. The molding was then fired on a platinum plate at the sintering temperature of 1100° C. for 2 hours in a reducing atmosphere (5% $H_2$/95% $N_2$).

In this way, a disc-shaped sintered material sample was obtained.

Example 11

As the starting materials, the Li compound ($Li_2CO_3$), the La compound ($La_2O_3$), the Zr compound ($ZrO_2$), Al compound ($Al_2O_3$), NiO, and $CoO_{4/3}$ were used. Initially, $Li_2CO_3$, $La_2O_3$, and $ZrO_2$ were weighed to achieve a molar ratio of Li:La:Zr=7:3:2. Further, $Al_2O_3$ was weighed to be 10 mol % with respect to the total amount of the $Li_xLa_3Zr_2O_{12}$ to be obtained. Thereafter, the weighed starting materials were mixed and pulverized in ethanol, using a ball mill (rotational speed 120 rpm/zirconia balls) for 16 hours. The resultant slurry was separated from the balls and ethanol and then calcined in an alumina crucible at 900° C. for 5 hours in the atmospheric air. Each of NiO and $CoO_{4/3}$ was weighed to be 25 mol % with respect to $Li_7La_3Zr_2O_{12}$, which is the principal component of the obtained calcined powder. The calcined powder, the NiO powder, and the $CoO_{4/3}$ powder were mixed and pulverized in ethanol using a ball mill (120 rpm/zirconia balls) for 16 hours. The resultant slurry was separated from the balls and ethanol and then dried. In this way, a pulverized powder was obtained. Then, an organic system binder was added to the pulverized powder, preparing a granule. The granule was molded into a disc shape using a metal mold of diameter 10 mm at 7 kN. The molding was then fired on a platinum plate at the sintering temperature of 1100° C. for 2 hours in a reducing atmosphere (5% $H_2$/95% $N_2$). In this way, a disc-shaped sintered material sample was obtained.

Example 12

As the starting materials, the Li compound ($Li_2CO_3$), the La compound ($La_2O_3$), the Zr compound ($ZrO_2$), $Al_2O_3$, CuO, and $FeO_{3/2}$ were used. Initially, $Li_2CO_3$, $La_2O_3$, and $ZrO_2$ were weighed to achieve a molar ratio of Li:La:Zr=7:3:2. Further, $Al_2O_3$ was weighed to be 10 mol % with respect to the total amount of the $Li_xLa_3Zr_2O_{12}$ to be obtained. Thereafter, the weighed starting materials were mixed and pulverized in ethanol, using a ball mill (rotational speed 120 rpm/zirconia balls) for 16 hours. The resultant slurry was separated from the balls and ethanol and then calcined in an alumina crucible at 900° C. for 5 hours in the atmospheric air. Each of CuO and $FeO_{3/2}$ was weighed to be 25 mol % with respect to $Li_7La_3Zr_2O_{12}$, which is the principal component of the obtained calcined powder. The calcined powder, the CuO powder, and the $FeO_{3/2}$ powder were mixed and pulverized in ethanol using a ball mill (120 rpm/zirconia balls) for 16 hours. The resultant slurry was separated from the balls and ethanol and then dried. In this way, a pulverized powder was obtained. Then, an organic system binder was added to the pulverized powder, preparing a granule. The granule was molded into a disc shape using a metal mold of diameter 10 mm at 7 kN. The molding was then fired on a platinum plate at the sintering temperature of 1100° C. for 2 hours in a reducing atmosphere (5% $H_2$/95% $N_2$). In this way, a disc-shaped sintered material sample was obtained.

Example 13

As the starting materials, the Li compound ($Li_2CO_3$), the La compound ($La_2O_3$), the Zr compound ($ZrO_2$), $Al_2O_3$, NiO, $CoO_{4/3}$, and CuO were used. Initially, $Li_2CO_3$, $La_2O_3$, and $ZrO_2$ were weighed to achieve a molar ratio of Li:La:Zr=7:3:2. Further, $Al_2O_3$ was weighed to be 10 mol % with respect to the total amount of the $Li_xLa_3Zr_2O_{12}$ to be obtained. Thereafter, the weighed starting materials were mixed and pulverized in ethanol, using a ball mill (rotational speed 120 rpm/zirconia balls) for 16 hours. The resultant slurry was separated from the balls and ethanol and then calcined in an alumina crucible at 900° C. for 5 hours in the atmospheric air. NiO, $CoO_{4/3}$, and CuO were weighed to be 20 mol %, 10 mol %, and 20 mol % respectively with respect to $Li_7La_3Zr_2O_{12}$, which is the principal component of the obtained calcined powder. The calcined powder, the NiO powder, the $CoO_{4/3}$ powder, and the CuO powder were mixed and pulverized in ethanol using a ball mill (120 rpm/zirconia balls) for 16 hours. The resultant slurry was separated from the balls and ethanol and then dried. In this way, a pulverized powder was obtained. Then, an organic system binder was added to the pulverized powder, preparing a granule. The granule was molded into a disc shape using a metal mold of diameter 10 mm at 7 kN. The molding was then fired on a platinum plate at the sintering temperature of 1100° C. for 2 hours in a reducing atmosphere (5% $H_2$/95% $N_2$). In this way, a disc-shaped sintered material sample was obtained.

Example 14

As the starting materials, the Li compound ($Li_2CO_3$), the La compound ($La_2O_3$), the Zr compound ($ZrO_2$), $Al_2O_3$, NiO, $CoO_{4/3}$, CuO, and $FeO_{3/2}$ were used. Initially, $Li_2CO_3$, $La_2O_3$, and $ZrO_2$ were weighed to achieve a molar ratio of Li:La:Zr=7:3:2. Further, $Al_2O_3$ was weighed to be 10 mol % with respect to the total amount of the $Li_xLa_3Zr_2O_{12}$ to be obtained. Thereafter, the weighed starting materials were mixed and pulverized in ethanol, using a ball mill (rotational speed 120 rpm/zirconia balls) for 16 hours. The resultant slurry was separated from the balls and ethanol and then calcined in an alumina crucible at 900° C. for 5 hours in the atmospheric air. NiO, $CoO_{4/3}$, CuO, and $FeO_{3/2}$ were weighed to be 20 mol %, 10 mol %, 10 mol %, and 10 mol % respectively with respect to $Li_7La_3Zr_2O_{12}$, which is the principal component of the obtained calcined powder. The calcined powder, the NiO powder, the $CoO_{4/3}$ powder, the CuO powder, and the $FeO_{3/2}$ powder were mixed and pulverized in ethanol using a ball mill (120 rpm/zirconia balls) for 16 hours. The resultant slurry was separated from the balls and ethanol and then dried. In this way, a pulverized powder was obtained. Then, an organic system binder was added to the pulverized powder, preparing a granule. The granule was molded into a disc shape using a metal mold of diameter 10 mm at 7 kN. The molding was then fired on a platinum plate at the sintering temperature of 1100° C. for 2 hours in a reducing atmosphere (5% $H_2$/95% $N_2$). In this way, a disc-shaped sintered material sample was obtained.

Table 3 shows the relative density and the ion conductivity of the sintered material including grain boundaries of the sintered material samples according to Examples 8 to 14.

TABLE 3

| | $Al_2O_3$ (mol %) | NiO (mol %) | $CoO_{4/3}$ (mol %) | CuO (mol %) | $FeO_{3/2}$ (mol %) | Relative density (%) | Ion conductivity (S/cm) |
|---|---|---|---|---|---|---|---|
| Example 8 | 10 | 0 | 50 | 0 | 0 | 91.2 | 6.2E−05 |
| Example 9 | 10 | 0 | 0 | 50 | 0 | 91.8 | 6.5E−05 |
| Example 10 | 10 | 0 | 0 | 0 | 50 | 90.2 | 5.7E−05 |
| Example 11 | 10 | 25 | 25 | 0 | 0 | 92.5 | 7.2E−05 |
| Example 12 | 10 | 0 | 0 | 25 | 25 | 90.4 | 5.8E−05 |
| Example 13 | 10 | 20 | 10 | 20 | 0 | 92.4 | 7.0E−05 |
| Example 14 | 10 | 20 | 10 | 10 | 10 | 91.1 | 6.0E−05 |

The composition ratio and various physical properties of the Examples and Comparative Examples were evaluated as follows.

Estimation of Sintering Density

The sintering density of the garnet-type Li-ion conductive oxide forming the disc-shaped sintered material was calculated as follows. First, the volume of the disc-shaped sintered material was measured using a caliper and a micrometer. Then, the dry weight of the disc-shaped sintered material was divided by the volume to calculate the sintering density of the disc-shaped sintered material. Based on the sintering density and a theoretical density, the relative density was calculated. As the theoretical density, the theoretical density of $Li_7La_3Zr_2O_{12}$ (5.1 g/cm³) was used. In the examples, the samples with the relative density of 90% or more were determined to be conforming articles.

Ion Conductivity Estimation

The impedance and phase angle were measured in a constant-temperature bath using an AC impedance analyzer (model 1260 manufactured by Solartron) at a measurement temperature of 25° C., a measurement frequency of 0.05 Hz to 1 MHz, and an amplitude voltage of 50 mV. Based on the measured values, a Nyquist plot was drawn, and resistance values were determined on the basis of its arc. From the resistance values, the ion conductivity of the sintered material including grain boundaries was calculated. During the measurement with the AC impedance analyzer, an Au electrode was used as a blocking electrode. The Au electrode was circular with diameter of 3 mm, and was formed by sputtering. In the examples, the samples were determined to be conforming articles if the ion conductivity of the sintered material including grain boundaries was not less than 5.0×10⁻⁵ (S/cm).

Chemical Composition Analysis

The sintered material samples obtained in Example 1 to Example 14 and Comparative Example 1 to Comparative Example 4 were dissolved, and ICP composition analysis was performed. As a result, it was confirmed that the feed composition had been substantially maintained.

Figure 2:
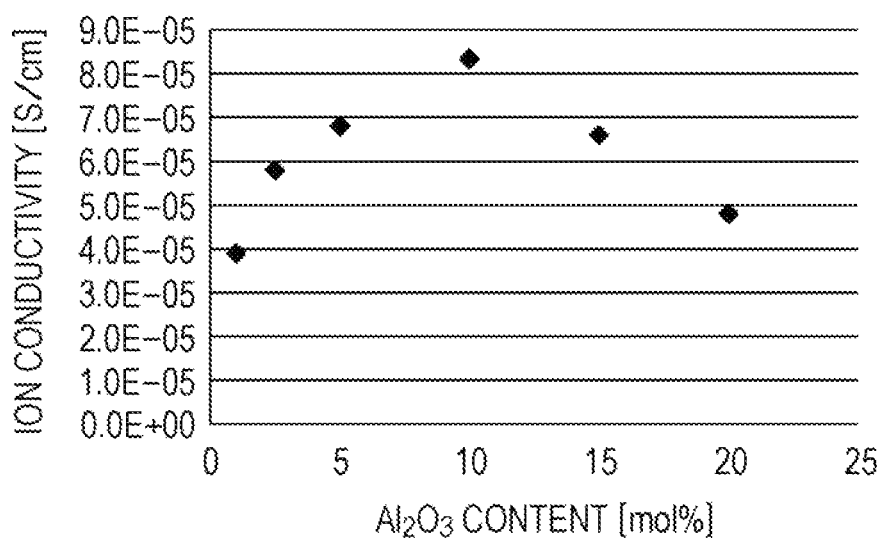
FIG. 2 is a diagram of the ion conductivity of sintered materials including grain boundaries of the garnet-type Li-ion conductive oxides obtained in Comparative Example 1, Comparative Example 2, and Example 1 to Example 4.

As shown in Table 1 and FIGS. 1 and 2, in Examples 1 to 4, the content of $Al_2O_3$ with respect to the compound expressed by the chemical formula $Li_7La_3Zr_2O_{12}$ included in the garnet-type Li-ion conductive oxide is in the range of 2.5 mol %≤$Al_2O_3$≤15 mol %. Compared with Comparative Examples 1 and 2, Examples 1 to 4 have high sintering density. Specifically, it was confirmed that in Examples 1 to 4, the relative density was 90% or more. It was also confirmed that in Example 1 to Example 4, the ion conductivity of the sintered material including grain boundaries was 5.0×10⁻⁵ (S/cm) or more.

Figure 3:
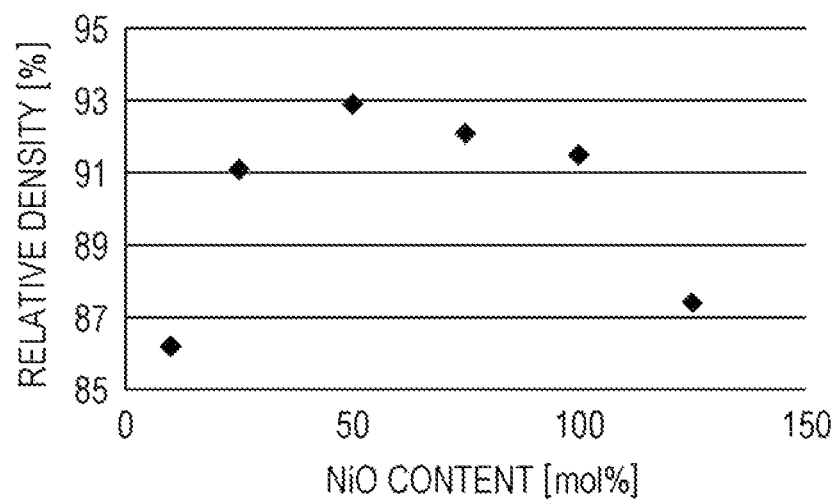
FIG. 3 is a diagram of the relative density of the garnet-type Li-ion conductive oxides obtained in Comparative Example 3, Comparative Example 4, Example 3, and Example 5 to Example 7.
Figure 4:
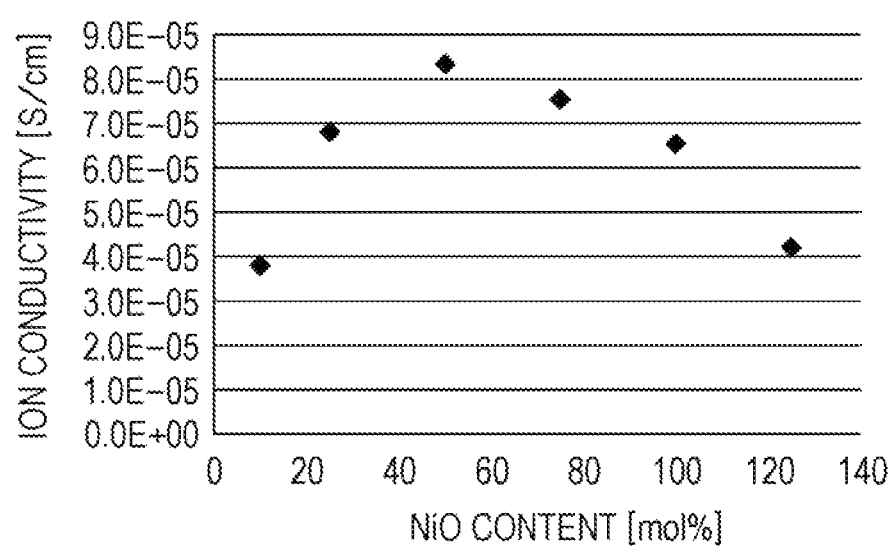
FIG. 4 is a diagram of the ion conductivity of the sintered materials including grain boundaries of the garnet-type Li-ion conductive oxides obtained in Comparative Example 3, Comparative Example 4, Example 3, and Example 5 to Example 7.

As shown in Table 2 and FIGS. 3 and 4, in Examples 3 and 5 to 7, the content of M (M is one or more oxides selected from NiO, CuO, $CoO_{4/3}$, and $FeO_{3/2}$) with respect to the compound expressed by the chemical formula $Li_7La_3Zr_2O_{12}$ included in the garnet-type Li-ion conductive oxide is in the range of 25 mol %≤M≤100 mol %. Compared with Comparative Examples 3 and 4, Examples 3 and 5 to 7 have high sintering density. Specifically, it was confirmed that in Examples 3 and 5 to 7, the relative density was 90% or more. It was also confirmed that in Examples 3 and 5 to 7, the ion conductivity of the sintered material including grain boundaries was 5.0×10⁻⁵ (S/cm) or more.

As shown in Table 3, in Examples 8 to 14, the content of M (M is one or more oxides selected from NiO, CuO, $CoO_{4/3}$, and $FeO_{3/2}$) with respect to the compound expressed by the chemical formula $Li_7La_3Zr_2O_{12}$ included in the garnet-type Li-ion conductive oxide is in the range of 25 mol %≤M≤100 mol %. Examples 8 to 14 have high sintering density. Specifically, it was confirmed that in Examples 8 to 14, the relative density was 90% or more. It was also confirmed that in Examples 8 to 14, the ion conductivity of the sintered material including grain boundaries was 5.0×10⁻⁵ (S/cm).

Example 15

In the following, examples of the all-solid lithium secondary battery will be described. However, the present disclosure is not limited to the examples. In the following description, "parts" indicates "parts by mass" unless otherwise noted.

Preparation of positive electrode active material and negative electrode active material As the positive electrode active material and the negative electrode active material, $Li_3V_2(PO_4)_3$ prepared by the method below was used. First, $Li_2CO_3$, $V_2O_5$, and $NH_4H_2PO_4$ as the starting material were wet mixed for 16 hours using a ball mill. The powder obtained after dehydration and drying was calcined for two hours at 850° C. in a nitrogen-hydrogen mix gas. The calcined product was pulverized by wet method and then dehydrated and dried, whereby the positive electrode active material powder and the negative electrode active material powder were obtained. It has been confirmed that the prepared powder had a constituent of $Li_3V_2(PO_4)_3$ according to the X-ray diffraction apparatus.

Preparation of Paste for Positive Electrode Active Material Layer and Paste for Negative Electrode Active Material Layer The paste for the positive electrode active material layer and the paste for the negative electrode active material layer were prepared as below. In other words, 15 parts of ethyl cellulose as the binder and 65 parts of dihydroterpineol as the solvent were added to 100 parts of powder of $Li_3V_2(PO_4)_3$ to be mixed. Thus, the powder is dispersed in the solvent, whereby the paste for the positive electrode active material layer and the paste for the negative electrode active material layer were obtained.

Preparation of Solid Electrolyte

In order to prepare the solid electrolyte, a Li compound ($Li_2CO_3$), a La compound ($La_2O_3$), a Zr compound ($ZrO_2$), and $Al_2O_3$ were used as the starting materials. The $Li_2CO_3$, $La_2O_3$, and $ZrO_2$ were weighed to achieve a molar ratio of Li:La:Zr=7:3:2. Further, $Al_2O_3$ was weighed to be 10 mol % with respect to $Li_7La_3Zr_2O_{12}$. Thereafter, the starting materials were mixed and pulverized in ethanol using a ball mill (rotational speed 120 rpm/zirconia balls) for 16 hours. The resultant slurry was separated from the balls and ethanol, and then calcined in an alumina crucible at 900° C. for 5 hours in the atmospheric air, obtaining a calcined powder.

Then, NiO was weighed to be 50 mol % with respect to $Li_7La_3Zr_2O_{12}$, which is the principal component of the calcined powder. The calcined powder, the NiO powder, and the solvent comprising 100 parts of ethanol and 200 parts of toluene were mixed and pulverized by wet method in a ball mill. After additionally feeding 16 parts of a polyvinyl butyral binder and 4.8 parts of benzyl butyl phthalate, a solid electrolyte layer paste was prepared by mixing.

Manufacture of Sheet for Solid Electrolyte Layer

By molding a sheet with the paste for the solid electrolyte layer on a PET film as the base material by a doctor blade method, a sheet for a solid electrolyte layer with a thickness of 15 μm was obtained.

Preparation of Paste for Positive Electrode Current Collector Layer and Paste for Negative Electrode Current Collector Layer The powder of Ni and $Li_3V_2(PO_4)_3$ used as the positive electrode current collector and the negative electrode current collector was mixed at a volume ratio of 80/20. After that, ethyl cellulose as the binder and dihydroterpineol as the solvent were added and mixed, whereby the powder was dispersed in the solvent and thus the paste for the positive electrode current collector layer and the paste for the negative electrode current collector layer were obtained. The average particle diameter of Ni was 0.9 nm.

Preparation of Terminal Electrode Paste

By mixing silver powder, epoxy resin, and solvent, the powder was dispersed in the solvent and a thermosetting terminal electrode paste was obtained.

With the use of these pastes, the lithium ion secondary battery was manufactured as below.

Manufacture of Positive Electrode Active Material Layer Unit

The paste for the positive electrode active material layer with a thickness of 5 μm was printed on the sheet for the above described solid electrolyte layer by the screen printing. The printed paste was dried for 10 minutes at 80° C. Next, the paste for the positive electrode current collector layer with a thickness of 5 μm was printed thereon by the screen printing. The printed paste was dried for 10 minutes at 80° C. The paste for the positive electrode active material layer with a thickness of 5 μm was printed again thereon by the screen printing. The printed paste was dried for 10 minutes at 80° C. Next, the PET film was removed. Thus, the sheet of the positive electrode active material layer unit was obtained in which the paste for the positive electrode active material layer, the paste for the positive electrode current collector layer, and the paste for the positive electrode active material layer were printed and dried in this order on the sheet for the solid electrolyte layer.

Manufacture of Negative Electrode Active Material Layer Unit

The paste for the negative electrode active material layer with a thickness of 5 μm was printed on the sheet for the above described solid electrolyte layer by the screen printing. The printed paste was dried for 10 minutes at 80° C. Next, the paste for the negative electrode current collector layer with a thickness of 5 μm was printed thereon by the screen printing. The printed paste was dried for 10 minutes at 80° C. The paste for the negative electrode active material layer with a thickness of 5 μm was printed again thereon by the screen printing. The printed paste was dried for 10 minutes at 80° C. Next, the PET film was removed. Thus, the sheet of the negative electrode active material layer unit was obtained in which the paste for the negative electrode active material layer, the paste for the negative electrode current collector layer, and the paste for the negative electrode active material layer were printed and dried in this order on the sheet for the solid electrolyte layer.

Fabrication of Stacked Body

One sheet of the positive electrode active material layer unit and one sheet of the negative electrode active material layer unit were stacked via a solid electrolyte layer sheet. At this time, the units were staggered such that the paste for the positive electrode current collector layer of the first sheet of the positive electrode active material layer unit extended only over one end face, with the paste for the negative electrode current collector layer of the second sheet of the negative electrode active material layer unit extending only over the other end face. On both sides of the stacked units, solid electrolyte layer sheets were stacked to a thickness of 500 μm. Thereafter, the stack was molded by thermal press-bonding and cut into stacked blocks. The stacked blocks were then simultaneously fired, obtaining stacked bodies. The simultaneous firing was performed by increasing the temperature to a firing temperature of 1100° C. at a temperature increase rate of 200° C./h in a reducing atmosphere, and then maintaining the temperature for 2 hours. After the firing, the stacked bodies were naturally cooled.

Step of Forming Terminal Electrode

The terminal electrode paste was coated to the end face of the stacking block.

The paste on the end face was thermally cured at 150° C. for 30 minutes, thereby forming a pair of terminal electrodes. Thus, the lithium ion secondary battery was completed.

Battery Evaluation

Leads were attached to the terminal electrodes of the obtained lithium-ion secondary battery, and a charging and discharging test was performed under the following measurement conditions. Specifically, the current at the time of both charging and discharging was 2.0 μA. The cut-off voltages at the time of charging and discharging were 4.0 V and 0 V, respectively. The battery charged and discharged well. With regard to the battery characteristics, in the secondary battery using the solid electrolyte of Comparative Example 1, the discharge capacity was 0.4 μA. On the other hand, the discharge capacity of the all-solid lithium secondary battery according to the example was 2.5 μA. Thus, it was learned that the all-solid lithium secondary batteries according to the example has very good battery characteristics.

As described above, according to the present manufacturing method, a garnet-type Li-ion conductive oxide having high sintering density can be prepared. The garnet-type Li-ion conductive oxide may be utilized for solid electrolyte in an all-solid Li-ion secondary battery.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A garnet-type Li-ion conductive oxide comprising $Li_xLa_3Zr_2O_{12}$ (6≤x≤8) and containing Al and element T (T is one or more from Ni, Cu, Co, and Fe), wherein
the content of Al is, in terms of $Al_2O_3$, 2.5 mol %≤$Al_2O_3$≤15 mol % with respect to a total amount of $Li_xLa_3Zr_2O_{12}$ contained in the garnet-type Li-ion conductive oxide, and
the content of element T is 25 mol %≤T≤100 mol % with respect to the total amount of $Li_xLa_3Zr_2O_{12}$ contained in the garnet-type Li-ion conductive oxide.

2. A garnet-type Li-ion conductive oxide comprising $Li_xLa_3Zr_2O_{12}$ (6≤x≤8) and containing $Al_2O_3$ and M (M is one or more oxides selected from NiO, CuO, $CoO_{4/3}$, and $FeO_{3/2}$), wherein
the contents of $Al_2O_3$ and M with respect to a total amount of $Li_xLa_3Zr_2O_{12}$ contained in the garnet-type Li-ion conductive oxide are such that
2.5 mol %≤$Al_2O_3$≤15 mol %, and
25 mol %≤M≤100 mol %.

3. An all-solid Li-ion secondary battery comprising the garnet-type Li-ion conductive oxide according to claim 1 as a solid electrolyte.

4. An all-solid Li-ion secondary battery comprising the garnet-type Li-ion conductive oxide according to claim 2 as a solid electrolyte.

* * * * *